United States Patent [19]

Matsumoto

[11] Patent Number: 5,643,374

[45] Date of Patent: Jul. 1, 1997

[54] PNEUMATIC TIRE INCLUDING FINE GROOVES

[75] Inventor: Hiroyuki Matsumoto, Kodaira, Japan

[73] Assignee: Bridgestone Corporation, Tokyo, Japan

[21] Appl. No.: 495,259

[22] Filed: Jun. 27, 1995

[30] Foreign Application Priority Data

Jun. 29, 1994 [JP] Japan .................. 6-147469

[51] Int. Cl.⁶ ........................................ B60C 11/12
[52] U.S. Cl. ............................ 152/209 R; 152/DIG. 3
[58] Field of Search .................. 152/209 R, 209 D, 152/DIG. 3

[56] References Cited

U.S. PATENT DOCUMENTS

| | | | |
|---|---|---|---|
| 3,104,693 | 9/1963 | Bolenbach | 152/209 |
| 4,298,046 | 11/1981 | Herbelleau et al. | 152/209 R |
| 4,836,257 | 6/1989 | Mamada et al. | 152/DIG. 3 |
| 5,158,626 | 10/1992 | Himuro | 152/209 R |
| 5,200,008 | 4/1993 | Enterline et al. | 152/209 R |
| 5,225,010 | 7/1993 | Shisheng | 152/209 R |
| 5,388,625 | 2/1995 | White | 152/209 R |

FOREIGN PATENT DOCUMENTS

| | | | |
|---|---|---|---|
| 384182 | 8/1990 | European Pat. Off. | 152/209 R |
| 2418719 | 9/1979 | France . | |
| 41202 | 3/1982 | Japan | 152/209 D |
| 62-261507 | 11/1987 | Japan . | |
| 1-34161 | 7/1989 | Japan . | |
| 195103 | 8/1989 | Japan | 152/209 D |
| 254004 | 10/1990 | Japan | 152/209 R |
| 727207 | 3/1955 | United Kingdom | 152/209 R |
| 2053817 | 2/1981 | United Kingdom . | |
| 2093777 | 9/1982 | United Kingdom . | |
| 2190048 | 11/1987 | United Kingdom . | |

OTHER PUBLICATIONS

Patent Abstracts of Japan, vol. 012 No. 141, (M-691), Apr. 28, 1988 & JP 62-261508.

Primary Examiner—Steven D. Maki
Attorney, Agent, or Firm—Sughrue, Mion, Zinn, Macpeak & Seas

[57] ABSTRACT

A pneumatic tire comprising a radial carcass, a belt and a tread portion is provided at its side end region of a ground contact area of the tread portion with a plurality of fine grooves, each being a groove in which each of opposed groove walls extends slantly in substantially a direction opposite to a rotating direction of the tire toward a groove bottom of the fine groove and considerably improves a straight running stability while controlling a wandering phenomenon during the running on slant road surface.

5 Claims, 3 Drawing Sheets

PNEUMATIC TIRE INCLUDING FINE GROOVES

BACKGROUND OF THE INVENTION

1. Field of the Invention

This invention relates to a pneumatic tire capable of controlling complicated movements of the tire or the so-called wandering phenomenon not predicted by a driver. This is produced when the tire is run at a higher speed on a road surface having slant portions or a rutted road surface, to improve a straight running stability.

2. Description of the Related Art

The high performance tire of this type is required to have a large lateral rigidity against a large lateral force produced in the tire during cornering or the like and excellent traction and braking performances in the high-speed running, steering stability and so on with a high power of a vehicle. For this end, tires having a wider ground contact width by making an aspect ratio small have become popular.

The tire having a small aspect ratio exhibits an excellent steering stability on a flat road surface. However, when the aspect ratio is particularly not more than 60%, if the tire having such an aspect ratio is run at a higher speed on a road surface having slant portions such as a rutted road surface or the like, a non-uniform force is locally applied to the tire due to the disorder of the road surface to produce complicated movements of the tire or the so-called wandering phenomenon, whereby the vehicle is moved in a direction not predicted by a driver. Such a wandering phenomenon is a risky factor damaging the straight running property of the vehicle, which becomes in a serious problem with the advance of high running performances of the tire.

SUMMARY OF THE INVENTION

It is, therefore, an object of the invention to provide high-performance pneumatic tires having particularly a small aspect ratio and controlling the wandering phenomenon by improving the straight running stability on slant road surface.

According to the invention, there is the provision of a pneumatic tire comprising a carcass toroidally extending between a pair of bead portions, a belt superimposed about a crown portion of the carcass and a tread portion arranged on the belt, characterized in that a plurality of fine grooves extending outward in a widthwise direction of the tread are arranged in each of side end regions outside a ground contact area of the tread portion in a circumferential direction of the tread when the tire is inflated under a normal internal pressure and loaded under a normal load, and each of these fine groove is a groove in which each of opposed groove walls extends slantly in substantially a direction opposite to a rotating direction of the tire toward a groove bottom of the fine groove.

In a preferable embodiment of the invention, each of lateral grooves extending in the widthwise direction of the tread define land portions at the side end region of the tread portion is rendered into a groove having opposed groove walls each extended slantly in substantially a direction opposite to the rotating direction of the tire toward the groove bottom, whereby the wandering is effectively controlled.

In other preferable embodiments of the invention, fine grooves and/or lateral grooves arranged in the ground contact area of the tread portion so as to extend in the widthwise direction of the tread are rendered into grooves each having opposed groove walls each extended slantly in substantially a direction opposite to the rotating direction of the tire toward the groove bottom. An inclination angle of each of these grooves is made gentler than that of the fine groove and/or lateral groove arranged in the side end region of the tread portion, or fine grooves and/or lateral grooves arranged in the ground contact area of the tread portion so as to extend in the widthwise direction of the tread are rendered into grooves each having opposed groove walls each extended slantly in substantially the rotating direction of the tire toward the groove bottom.

BRIEF DESCRIPTION OF THE DRAWINGS

The invention will be described with reference to the accompanying drawings, wherein.

DESCRIPTION OF THE PREFERRED EMBODIMENTS

Figure 1:
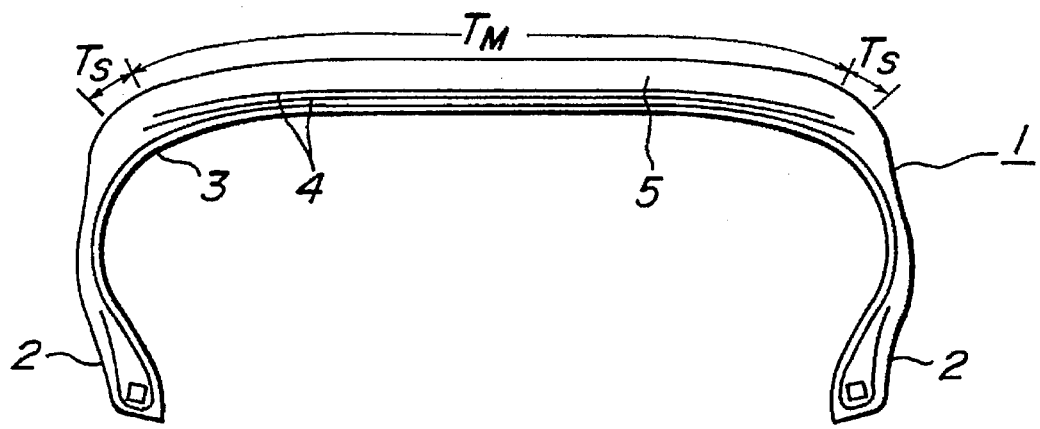
FIG. 1 is a radial section view of an embodiment of the pneumatic tire according to the invention.

In FIG. 1 is sectionally shown a typical pneumatic tire according to the invention in a widthwise direction of a tread.

Figure 2:
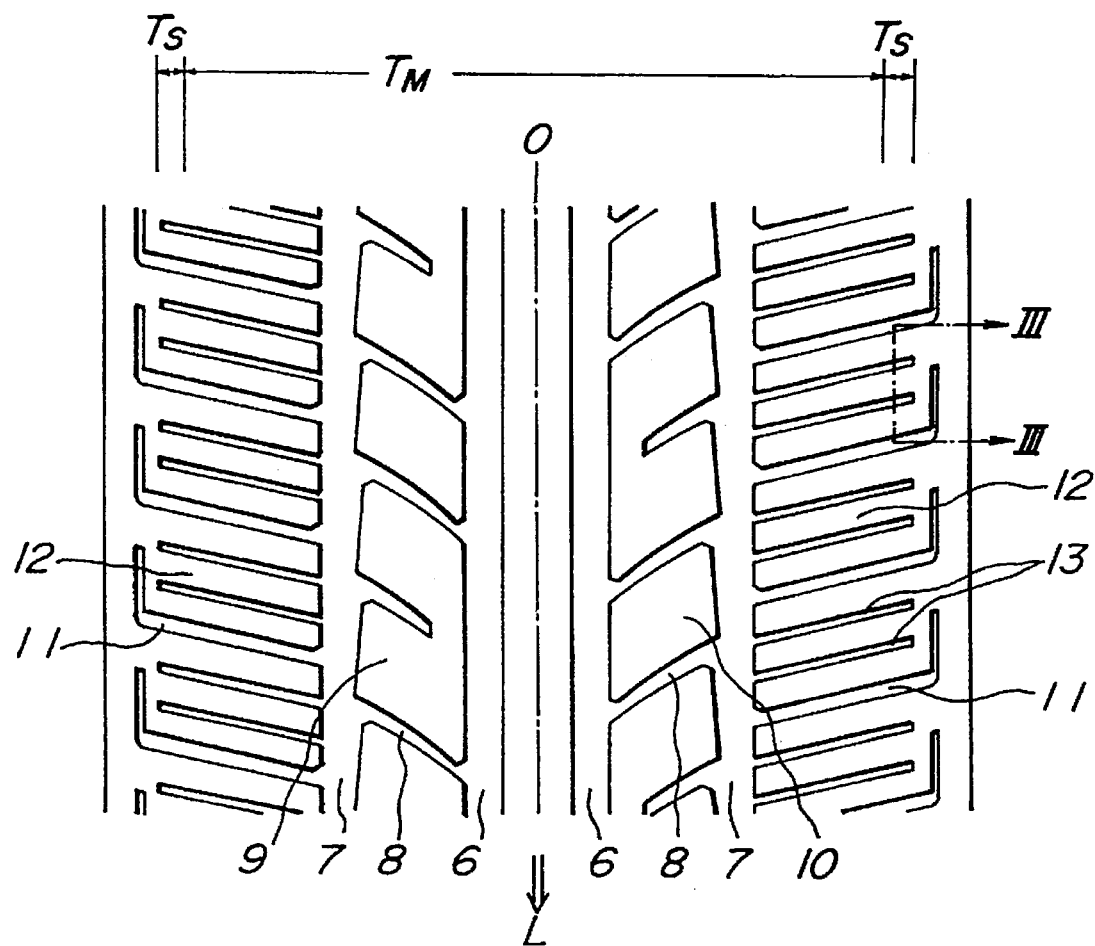
FIG. 2 is a diagrammatic view of a tread pattern in the pneumatic tire according to the invention.

The pneumatic tire 1 comprises a carcass 3 toroidally extending between a pair of bead portions 2, a belt 4 superimposed about a crown portion of the carcass and comprised of two belt layers and a tread portion 5 arranged on the belt. The outer surface of the tread portion 5 has such a tread pattern as shown in FIG. 2 that a pair of circumferential grooves 6 are arranged at both sides of an equatorial plane 0 therealong. A pair of auxiliary circumferential grooves 7 are arranged outside the circumferential grooves 6 in a region toward a side end of the tread. A land portion defined by these circumferential groove 6 and the auxiliary circumferential groove 7 is divided into a plurality of blocks 9 and 10 by a plurality of lateral grooves 8 each extending slantly with respect to the equatorial plane 0 and connecting the circumferential groove 6 to the auxiliary circumferential groove 7. A land portion defined by the auxiliary circumferential groove 7 and the tread side end is divided into a plurality of blocks 12 by a plurality of lateral grooves 11 extending in the widthwise direction of the tread. This tread pattern is a so-called directional pattern in which the lateral grooves 8 are extended so as to converge toward the equatorial plane in such a manner that the inclinations of the lateral grooves 8 located at both sides of the circumferential grooves 6 with respect to the equatorial plane are opposite to each other. The tire having such a tread pattern is mounted on a vehicle so as to match a rotating direction L of the tire with a running direction of the vehicle. Furthermore, each of the blocks 12 is provided with one or more fine grooves 13, two fine grooves 13 in the illustrated embodiment. The fine groove 13 includes a so-called sipe if the width of the fine groove 13 is not more than a half of the width of the lateral groove 11 and the opposed groove walls of the fine groove are closed to each other in the contact with the ground.

In the invention, it is essential that the fine groove 13 located at a side end region $T_S$ outside a ground contact area $T_M$ of the tread portion when the tire is inflated under a normal internal pressure and loaded under a normal load is a groove in which each of opposed groove walls extends slantly in substantially a direction opposite to the rotating direction L of the tire. In other words, the groove wall of the fine groove 13 slantly extends in a direction opposite to the converging direction of the lateral groove 8 at the equatorial plane of the tire.

Figure 3:
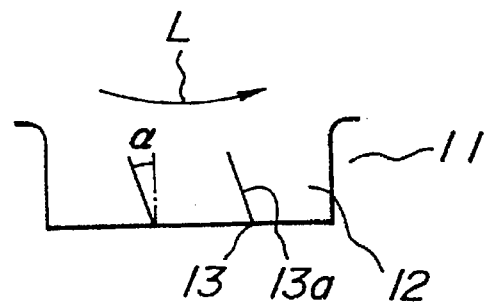
FIG. 3 is a schematically sectional view taken along a line III—III of FIG. 2.

That is, as shown in FIG. 3 showing a section taken along a line III—III of FIG. 2, the groove wall 13a of the fine groove 13 is inclinated in a direction opposite to the rotating direction L of the tire with respect to a radial direction of the tire, whereby the ground contact pressure of the side end region $T_S$ of the tread is increased in the contacting with a slant road surface. In this case, an inclination angle α of the groove wall 13a with respect to the radial direction of the tire is preferably within a range of 5°–15°.

Figure 4:
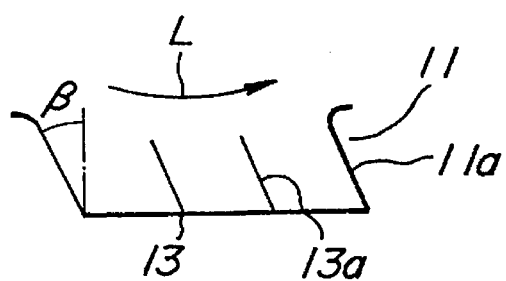
FIG. 4 is a schematically sectional view of another embodiment taken along a line III—III of FIG. 2.

As shown in FIG. 4 showing another section taken along a line III—III of FIG. 2, the groove wall 11a of the lateral groove 11 is inclined in a direction opposite to the rotating direction L of the tire with respect to the radial direction of the tire. As a result, the ground contact pressure of the side end region $T_S$ of the tread is also increased by contacting with the slant road surface. In this case, an inclination angle β of the groove wall 11a with respect to the radial direction of the tire is preferably within a range of 5°–15°.

As mentioned above, the groove walls of the fine grooves and further the lateral grooves in the side end region are inclined to increase the ground contact pressure at the side end region $T_S$, whereby the control of the wandering phenomenon is realized. The control of the wandering phenomenon is described in detail below.

The inventors have made studies with respect to a mechanism of generating the wandering phenomenon when the tire is run on a slant road surface such as rutted road surface or the like, and confirmed that a large lateral force $F_y$ is applied to the tire due to the increase of camber thrust $F_c$ received from the slant road surface and particularly the straight running stability is damaged due to the increase of the lateral force $F_y$ in case of the tire having a small aspect ratio. Therefore, in order to control the wandering phenomenon, it is effective to reduce the lateral force applied to the tire during running on the slant road surface or reduce the camber thrust.

Figure 5:
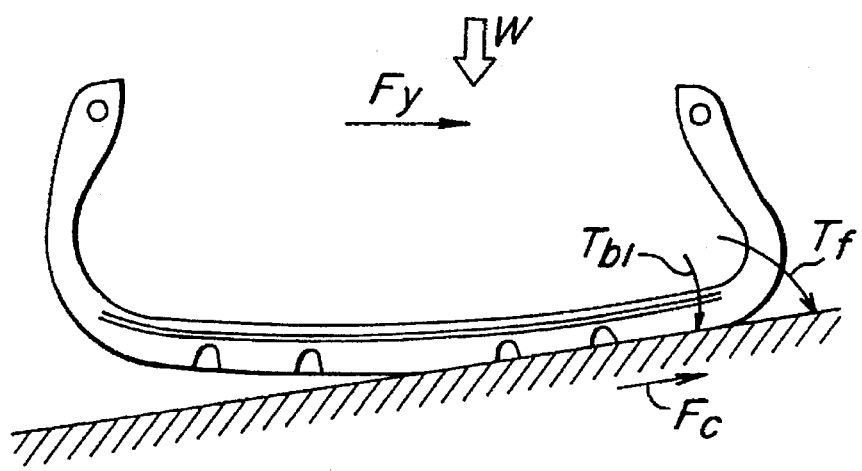
FIG. 5 is a diagrammatic view illustrating a state of contacting the tire with a slant road surface.

Observing the behavior of the tire during the running on the slant road surface, as shown in FIG. 5, a region of the ground contact area facing the slant road surface (mountain side) is forcedly pushed onto the road surface, while a region of the ground contact area opposing to the slant road surface (valley side) is floated from the road surface. In the region forcedly pushed onto the road surface, the deflection deformation of the sidewall portion becomes large under loading W applied to the tire, whereby the falling deformation $T_f$ of the carcass ply is caused and hence the side end region of the tread located outside the ground contact area in the vicinity of the falling deformed portion is newly contacted with the slant road surface. At the same time, the bending deformation $T_{b1}$ is caused in the vicinity of the belt end accompanied with the falling deformation $T_f$, whereby the ground contact pressure is increased in the vicinity of the end of the ground contact area. Moreover, the side end region of the tread changes in accordance with the inclination angle of the slant road surface or the like, but is a region located at each side of the ground contact area of the tread at a distance corresponding to 0.1 times the ground contact width.

From the above examination, it is guessed that the large camber thrust inducing the wandering phenomenon results from the increase of the ground contact pressure in the side end region of the tread.

According to the invention, the increase of the ground contact pressure in the side end region during the running on the slant road surface is inversely utilized to reduce the camber thrust to thereby control the wandering phenomenon. For this purpose, the fine groove formed in the land portion at the side end region of the tread is rendered into a groove in which each of opposed groove walls extends slantly in substantially a direction opposite to the rotating direction of the tire as shown in FIG. 3. That is, when the ground contact pressure in the side end region is increased as mentioned above, since the groove wall of the fine groove is inclined in a direction opposite to the rotating direction of the tire, the land portion defined by these fine grooves causes shearing deformation as shown by dotted lines in FIG. 6 and hence a shearing force $F_{xs}$ in the running direction is applied from the road surface to the land portion as a reaction force. As a result, a shearing force $F_{xs}$ is applied to the side end region in the ground contact area of the tread on the slant road surface as shown in FIG. 7, whereby moment $M_{xs}$ giving a slip angle $\gamma_{xs}$ is produced in the tire. The slip angle $\gamma_{xs}$ turns the rotating face of the tire toward a direction of falling downward on the slant road surface and hence the camber thrust $F_y$ is reduced.

When the inclination angle α of the groove wall in the fine groove shown in FIG. 3 is less than 5° with respect to the radial direction of the tire, the above function and effect are not so developed. When it exceeds 15°, it is difficult to peel off the tire from a mold after the tire building-up and vulcanization.

Figure 6:
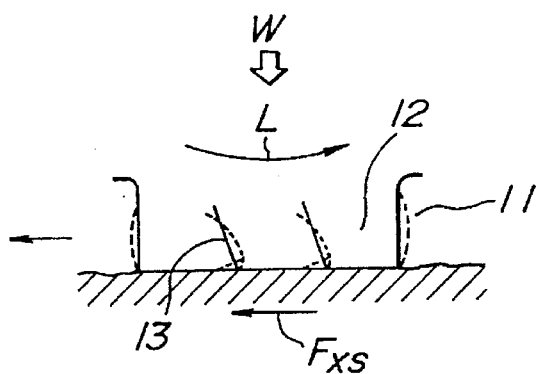
FIG. 6 is a diagrammatic view illustrating a behavior of a land portion including fine grooves.
Figure 7:
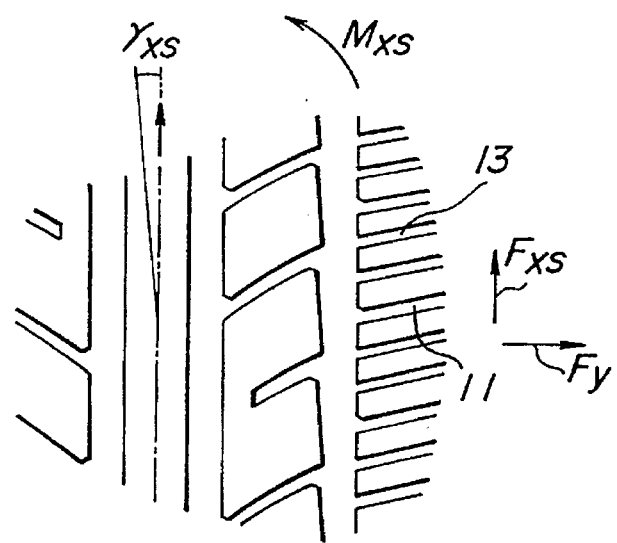
FIG. 7 is a diagrammatic view of a ground contact area of a tread portion at a slant road surface.
Figure 8:
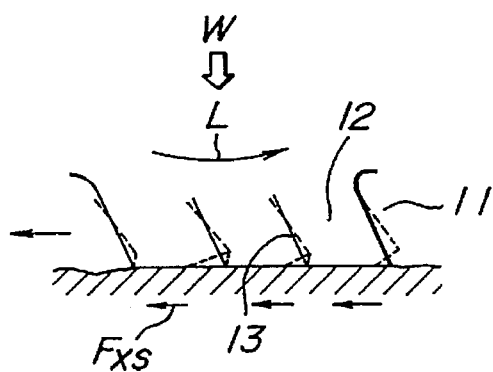
FIG. 8 is another diagrammatic view illustrating a behavior of a land portion including fine grooves.

Furthermore, when the lateral groove defining the block in the side end region is arranged to be inclined likewise the fine groove as shown in FIG. 4, the same function as shown in FIG. 6 can be expected as shown in FIG. 8, whereby the effect of reducing the camber thrust $F_y$ can be further enhanced.

The inclination angle β of the groove wall in the lateral groove of FIG. 4 with respect to the radial direction of the tire is preferably within a range of 5°–15° from the same reasons as described on the inclination angle α in the fine groove.

The land portions arranged side by side at the side end region in the circumferential direction creates slipping to the road surface when it is get out from the road surface during the running of the tire. As a result, it is apt to unevenly wear a side of the land portion finally get out from the road surface or so-called kicking-out side thereof. When the groove walls of the fine groove and lateral groove are inclined in the side end region, deformations as shown by dotted lines in FIGS. 6 and 8 are caused in the contacting with the road surface, so that the ground contact pressure in the kicking-out side edge may increase to promote the occurrence of the uneven wear. For this end, the inclination angle of the groove wall in the fine groove and the lateral groove located in the ground contact area of the tread running on flat road surface is made small as compared with the inclination angle of the groove wall in the fine groove and the lateral groove located in the side end region running on the slant road surface. Alternatively, the fine groove and the lateral groove in the ground contact area are inclined in the rotating direction of the tire, whereby straight running stability can be improved without causing uneven wear.

Moreover, it is favorable that the number of fine grooves arranged in the side end region is set to be larger than that in the ground contact area of the tread. That is, it is desirable that the number of fine grooves is increased even in the end portion of the ground contact area for the increasing the ground contact pressure on the slant road surface, but the number of fine grooves is critical in order to avoid the uneven wear in the ground contact area. For this end, it is desired that the number of fine grooves in the side end region not depending upon this restriction is made larger than that in the ground contact area to simultaneously prevent the occurrences of uneven wear and wandering phenomenon.

The following examples are given in illustration of the invention and are not intended as limitations thereof.

A pneumatic radial tire having a tire size of 235/45ZR17 is prepared according to a structure and a shape as shown in FIGS. 1 and 2. In this tire, the belt is comprised of two rubberized belt layers each containing steel cords arranged at a cord angle of 22° with respect to the equatorial plane of the tire, the cords of which layers being crossed with each other, and has a width of about 220 mm. Furthermore, the width of the ground contact area $T_M$ of the tread is 190 mm.

In a portion of the block 12 located in the ground contact area $T_M$ and outside a region corresponding to 0.7 times the ground contact width around the equatorial plane of the tire, the inclination angle $\alpha$ of the fine groove 13 having a width of 0.5 mm and a depth of 8 mm and the inclination angle $\beta$ of the lateral groove 11 having a width of 3 mm and a depth of 8 mm are changed as shown in Table 1. In the remaining portion of the block 12 located in the side end region $T_S$ outside the ground contact area at a distance corresponding to 0.13 times the ground contact width, the inclination angles $\alpha$ and $\beta$ are changed as shown in Table 1, while the depths of the fine groove 13 and the lateral groove 11 are gradually reduced from 8 mm to 3 mm.

A comparative tire is prepared to have the same shape and structure as the above tire except that the inclination angles $\alpha$ and $\beta$ of the fine groove and the lateral groove are 0°, respectively.

Each of these tires is inflated under a normal internal pressure of 2.4 kgf/cm² and then run on a flat belt type testing machine lined with a safety walk having an inclination angle of 5° on its surface at a speed of 50 km/h under a normal load of 650 kgf (JATMA), during which the lateral force $F_y$ in a direction of raising on the slant surface is measured.

Furthermore, the tire is mounted onto a passenger car of FR driving system having a displacement of 3000 cc and run on a rutted road surface at a high speed (80 km/h) under a loading two persons, during which the straight running stability is evaluated at a ten point stage by a feeling test of a driver.

Moreover, the tire is run on a course consisting of expressway and general-purpose road at a ratio of 4:6 at a speed of about 100 km/h in the former road and a speed of about 50 km.h in the latter road over a distance of 10,000 km, and thereafter a worn difference between a central part in widthwise direction and each edge part in the circumferential direction of the block located at the end of the ground contact area is measured to evaluate the resistance to uneven wear.

The measured results are also shown in Table 1. As seen from the data of Table 1, in the tires according to the invention, the lateral force $F_y$ is considerably controlled to improve the straight running stability and also the wear resistance is good.

TABLE 1

| Inclination angles $\alpha$, $\beta$ in end portion of ground contact area | Inclination angles $\alpha$, $\beta$ in side end region | Lateral force Fy | Straight running stability | Resistance to uneven wear as worn difference (mm) | Remarks |
| --- | --- | --- | --- | --- | --- |
| 0° | 0° | 100 | 5 | 1.2 | Comparative Example |
| 5° | 8° | 87 | 6.5 | 1.4 | Acceptable Example |
| −2° | 8° | 93 | 5.7 | 1.1 | Acceptable Example |
| 5° | 5° | 92 | 5.8 | 1.3 | Acceptable Example |

As mentioned above, according to the invention, the straight running stability on slant road surface such as rutted road or the like can be improved in the pneumatic tires, particularly high-performance radial tires having a small aspect ratio.

What is claimed is:

1. A pneumatic tire comprising: a carcass toroidally extending between a pair of bead portions, a belt superimposed about a crown portion of the carcass and a tread portion arranged on the belt, the tire having an equatorial plane, said tread portion having a ground contact area and side end regions when the tire is inflated under a normal internal pressure and loaded under a normal load on a flat road, each side end region being located outside of the ground contact area, said tread having a plurality of fine grooves which extend in a widthwise direction of the tread, said fine grooves being arranged on at least one side of the equatorial plane such that each fine groove includes a first portion located within a side end region and a second portion located within the ground contact area, each fine groove having a pair of walls, each of the walls of the first portion of the fine groove being inclined at an inclination angle with respect to the radial direction of the tire, the direction of inclination of said walls of the first portion being opposite to a rotating direction of the tire toward a groove bottom thereof and wherein either each of the walls of the second portion of the fine groove is inclined at an angle with respect to the radial direction of the tire which is smaller than said inclination angle and the direction of inclination of the walls of the second portion of the fine groove is inclined in a direction opposite to the rotating direction of the tire, or each of the walls of the second portion of the fine groove is inclined at an angle with respect to the radial direction of the tire and the direction of inclination of the walls of the second portion of the fine groove is in the rotating direction of the tire.

2. A pneumatic tire according to claim 1, wherein each of the walls of the second portion of the fine groove is inclined in the rotating direction of the tire toward the groove bottom.

3. A pneumatic tire according to claim 1, further comprising lateral grooves extending in the widthwise direction of the tread to define land portions at the side end regions of the tread, said lateral grooves having opposed groove walls each inclined at an inclination angle with respect to the radial direction of the tire, the direction of inclination of the walls of the lateral grooves being in a direction opposite to the rotating direction of the tire toward the groove bottom thereof.

4. A pneumatic tire according to claim 3, wherein the groove walls of the fine grooves and/or the lateral grooves at a side end region of the tread have an inclination angle of 5°–15° with respect to the radial direction of the tire.

5. A pneumatic tire according to claim 1, wherein the number of fine grooves located in a side end region of the tread is larger than the number of fine grooves located in the ground contact area thereof.

* * * * *